W. V. TURNER.
FLUID PRESSURE BRAKE.
APPLICATION FILED DEC. 28, 1916.
1,280,332.
Patented Oct. 1, 1918.
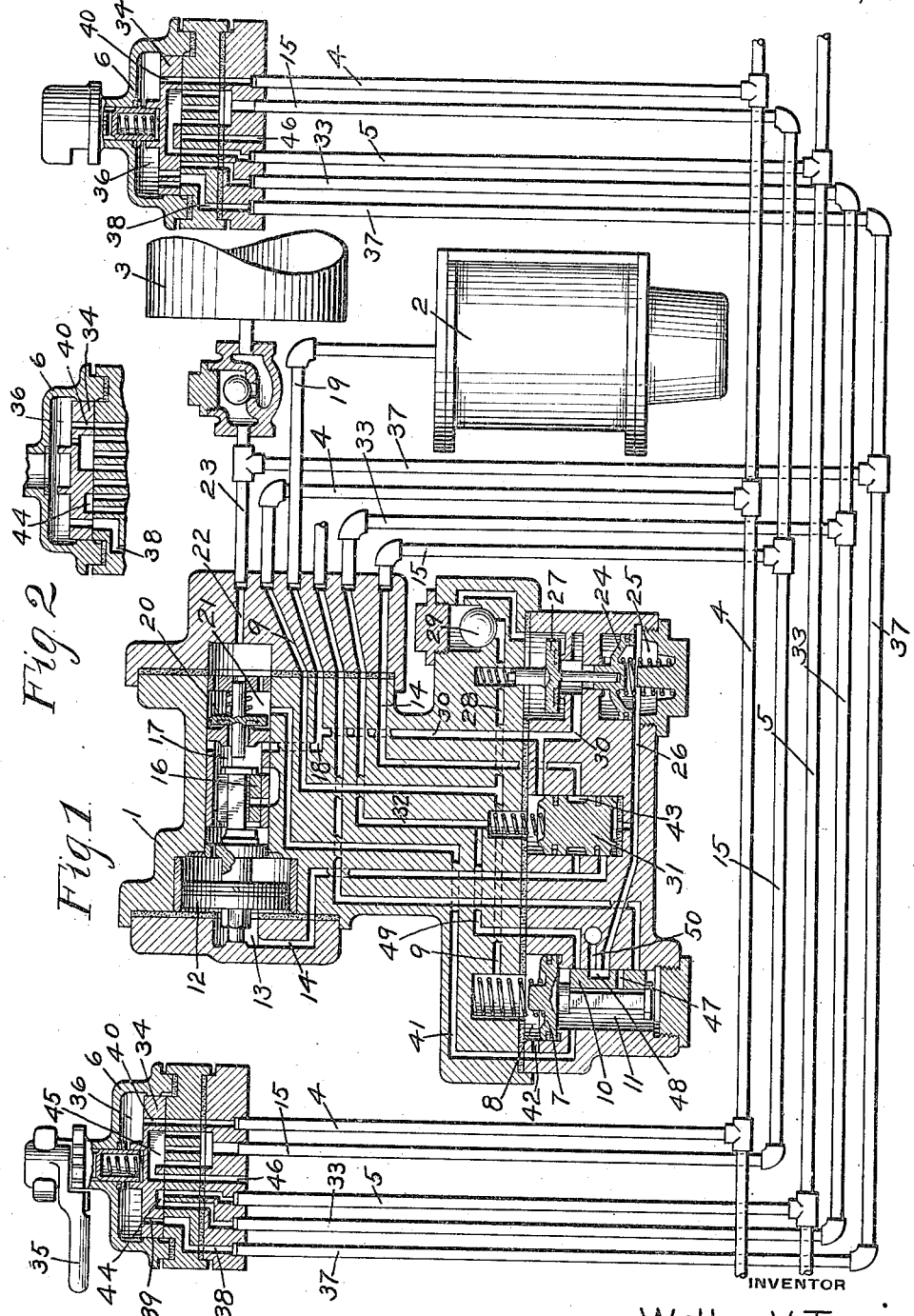
INVENTOR
Walter V. Turner
by Wm. M. Cady
Atty.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,280,332. Specification of Letters Patent. Patented Oct. 1, 1918.

Application filed December 28, 1916. Serial No. 139,376.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to a combined automatic and straight air brake equipment.

The principal object of my invention is to secure a more nearly uniform and a prompter straight air application and release of the brakes on a plurality of cars connected up in a train.

In the accompanying drawing: Figure 1 is a diagrammatic view, mainly in section, of a car air brake equipment embodying my invention; and Fig. 2 a central sectional view of one of the brake valve devices, showing the rotary valve in straight air service application position.

As shown in Figure 1 of the drawing, the equipment for a motor car may comprise a relay straight air emergency valve device 1, a brake cylinder 2, a main reservoir 3, an emergency brake pipe 4, a train straight air pipe 5, and a brake valve device 6 at each end of the car. On trailer cars the equipment is similar except that there are no brake valves and instead of the main reservoir, an auxiliary reservoir is employed.

The straight air emergency valve device 1 may comprise a casing containing an emergency valve device, an application and release valve device, and a quick action valve device.

The emergency valve device comprises a piston 7 contained in piston chamber 8 connected by passage 9 to the emergency brake pipe 4 and a slide valve 10 contained in valve chamber 11.

The application and release valve device comprises a piston 12 contained in an application chamber 13 connected by passage 14 to a pipe 15 leading to the brake valve device 6 at each end of the car, a release valve 16 contained in valve chamber 17 connected by passage 18 and pipe 19 to brake cylinder 2, and an application valve 20 of the puppet type, contained in a valve chamber 21 which is connected by passage 22 and pipe 23 to the main reservoir 3.

The quick action valve device comprises a piston 24 contained in piston chamber 25 connected to a passage 26 leading to the seat of slide valve 10 and a valve 27 for controlling the venting of fluid from the emergency brake pipe 4 through passage 28 containing check valve 29 to passage 30 leading to brake cylinder passage 18.

Interposed in passage 14 is a piston valve 31 for controlling communication through said passage, one side of the piston valve 31 being connected to a passage 32 leading to pipe 33 and the opposite side being connected to passage 26.

The brake valve 6 comprises a rotary valve 34 adapted to be operated by a removable handle 35 and contained in valve chamber 36 which is connected in certain positions of the rotary valve with the main reservoir 3 through pipe 37 and passage 38.

In operation, with the operating brake valve on the head car in release position as shown at the left of Fig. 1 and the other brake valves on the trailing motor cars in handle off position as shown at the right of Fig. 1, fluid under pressure is supplied from the main reservoir 3 through pipe 37, passage 38, and port 39 to rotary valve chamber 36 and thence flows through port 40 to emergency brake pipe 4.

On the motor car, the main reservoir 3 is connected to valve chamber 11 through passage 41, while on the trailer cars, the auxiliary reservoir is charged from the brake pipe through a port 42 leading from piston chamber 8 to passage 41.

If it is desired to effect a straight air service application of the brakes, the operating brake valve is turned to the position shown in Fig. 2 of the drawing, in which fluid is supplied through the brake valve to the pipe 15 and thence through passage 14 and groove 43 to application chamber 13. The piston 12 on the head car is then operated to close the brake cylinder release valve 16 and open the supply valve 20, so that fluid is supplied from the main reservoir to the brake cylinder.

Fluid supplied to the brake cylinder on the head car also flows through passage 30 to passage 32 and pipe 33 which is connected by a cavity 44 in the rotary valve with straight air pipe 5.

On the trailing motor cars, the brake valves are in handle off position, as shown at the right of Fig. 1, so that the straight air pipe 5 is connected by a cavity in the rotary valve with pipe 15. As a consequence, fluid flows from the straight air pipe 5 through pipe 15 to passage 14 in the straight air emergency valve device, and thence to piston chamber 13, so that piston 12 is actuated to effect the admission of fluid to the brake cylinder on the trailing motor cars.

On trailer cars not provided with brake valves, the straight air pipe is connected directly to the passage 14, so that fluid from the straight air pipe is supplied to piston 12 for operating same.

Communication through the brake valves on the trailing motor cars from the straight air pipe to the straight air emergency valve is restricted, so that a rapid build up of pressure on the piston 12 of the head car is assured. On the other hand, the pressure in the straight air pipe is increased at a rate corresponding with the rate of increase in brake cylinder pressure on the head car, since fluid supplied to the brake cylinder on the head car is also supplied to the straight air pipe and consequently, the rise in brake cylinder pressure throughout the train is made more uniform.

The brake cylinder pressure on the head car will be maintained at a substantially constant pressure corresponding with the pressure of fluid supplied to the piston chamber 13 and at the same time the pressure in the straight air pipe and on the pistons 12 of the trailing cars will be maintained, since this pressure is regulated with the pressure in the brake cylinder on the head car.

In releasing the brakes, the brake valve is turned to release position, as shown at the left of Fig. 1 of the drawing, in which the pipe 15 is connected by cavity 45 with exhaust port 46. Fluid is therefore vented from piston chamber 13 through passage 14 and pipe 15, so that the piston 12 is shifted by brake cylinder pressure to release position in which fluid is released from the brake cylinder on the head car through the release valve 16. Fluid is also exhausted from the straight air pipe through cavity 44 in the rotary valve, pipe 33, passage 32, passage 30, and passage 18, so that the quick release of the brakes on the trailing cars is facilitated by the rapid exhaust of fluid from the straight air pipe through the exhaust valve 16 of the straight air emergency valve on the head car.

If a sudden reduction in pressure in the emergency brake pipe 4 is effected, the emergency piston 7 will be shifted, so that passage 26 registers with port 47 and fluid is thereupon supplied from valve chamber 11 to piston chamber 25. The quick action piston 24 is then actuated to open valve 27 and effect the venting of fluid from the emergency brake pipe to the brake cylinder through passage 30.

Fluid is also supplied through passage 26 to the under side of piston 31, and since a cavity 48 now connects passage 32 through a passage 49 with exhaust port 50, the upper face of piston 31 is vented to the atmosphere, and the piston is shifted so as to cut off communication through passage 14. The escape of fluid through the straight air pipe is thus prevented, and further, the movement of the piston 31, opens passage 14 to passage 26, so that fluid is supplied from valve chamber 11 to the piston chamber 13, thereby effecting the movement of piston 12, so as to open the valve 20 and supply fluid to the brake cylinder.

Having now described my invention, what I claim as new and desire to secure by Letters Patent is:

1. In a fluid pressure brake, the combination with a brake cylinder and a straight air train pipe, of means operated by variations in fluid pressure for supplying fluid to the brake cylinder and the straight air pipe and a manually operated brake valve for varying the fluid pressure on said means.

2. In a fluid pressure brake, the combination with a brake cylinder and a straight air pipe, of a valve device operated by an increase in fluid pressure for supplying fluid to the brake cylinder and the straight air pipe.

3. In a fluid pressure brake, the combination with a brake cylinder, a valve device for supplying fluid to the brake cylinder, and a straight air train pipe, of a brake valve device having a position for supplying fluid to said valve device for operating same and for connecting the brake cylinder with the straight air pipe.

4. In a fluid pressure brake, the combination with a brake cylinder and a valve device having an application chamber and operated by an increase in pressure in the application chamber for supplying fluid to the brake cylinder, of a straight air train pipe and a brake valve device having a position for supplying fluid to the brake cylinder and for connecting the brake cylinder to the straight air train pipe.

5. In a fluid pressure brake, the combination with a brake cylinder, and a valve device having a piston subject to the opposing pressures of the brake cylinder and an application chamber and operated by an increase in pressure in the application chamber for supplying fluid to the brake cylinder, of a straight air train pipe and a brake valve device adapted in service position to supply fluid to the application chamber and from the brake cylinder to the straight air train pipe.

6. In a fluid pressure brake, the combination with a brake cylinder and a valve device having an application chamber and operated by an increase in pressure in the application chamber for supplying fluid to the brake cylinder, of a straight air train pipe and a brake valve device having one position for supplying fluid to the application chamber and from the brake cylinder to the straight air train pipe, and another position for connecting the straight air pipe with the application chamber.

7. In a fluid pressure brake, the combination with a brake cylinder and a valve device having an application chamber and operated by an increase in pressure in the application chamber for supplying fluid to the brake cylinder, of a brake valve, a straight air train pipe, an emergency brake pipe, valve means for controlling communication from the brake cylinder to the straight air pipe and from the brake valve to the application chamber, and an emergency valve device operated by a sudden reduction in brake pipe pressure for operating said valve means.

In testimony whereof I hereunto set my hand.

WALTER V. TURNER.

Copies of this patent may be obtained for five cents each, by addressing the "Commissioner of Patents, Washington, D. C."